W. CAMP.
CAR-COUPLING.

No. 172,846. Patented Feb. 1, 1876.

Witnesses:
J. W. Herthel.
Chas. D. Weimer.

Inventor:
William Camp
per Herthel & Co.
attys.

UNITED STATES PATENT OFFICE.

WILLIAM CAMP, OF KIRKWOOD, MISSOURI, ASSIGNOR OF ONE-HALF HIS RIGHT TO CHRISTOPHER W. SPALDING.

IMPROVEMENT IN CAR-COUPLINGS.

Specification forming part of Letters Patent No. 172,846, dated February 1, 1876; application filed March 11, 1875.

*To all whom it may concern:*

Be it known that I, WILLIAM CAMP, of Kirkwood, St. Louis county, State of Missouri, have invented an Improved Car-Coupling, of which the following is a specification:

This invention relates to the combination of parts, constructed and arranged, with relation to each other, to operate as will now more fully appear.

Figure 1:
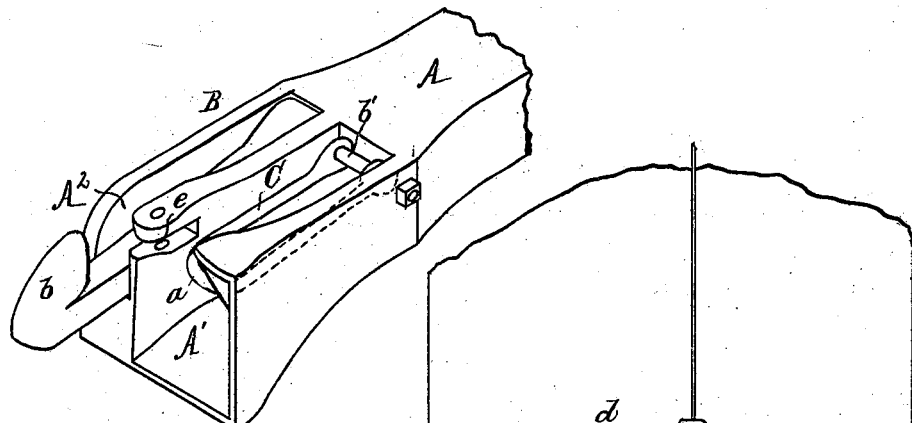
Figure 2:
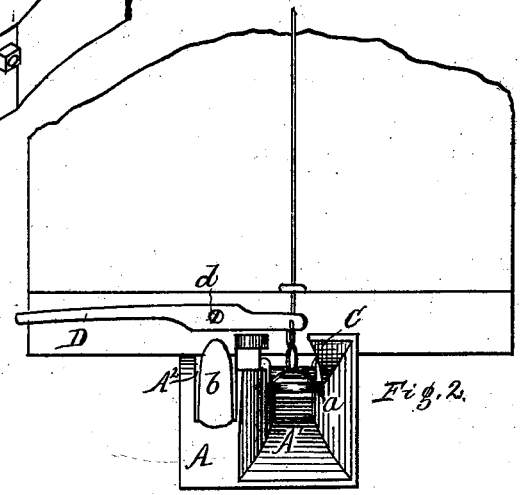
Figure 3:
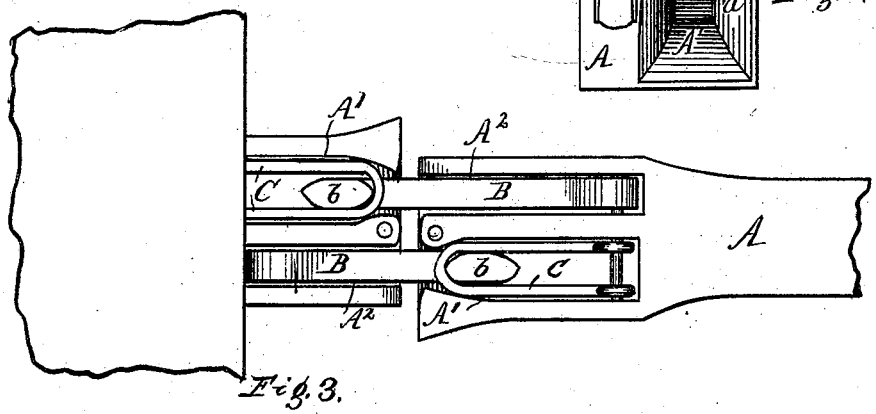
Figure 4:
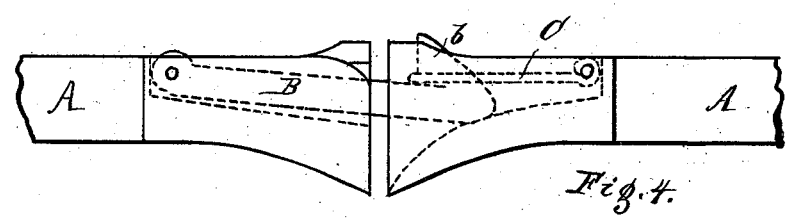

Of the drawing, Figure 1 is a perspective view, showing my improved draw-head with its link and draw-hook. Fig. 2 is a front elevation of same parts, together with lever and rod connections for uncoupling. Fig. 3 is a top plan of coupling united. Fig. 4 is a side elevation of Fig. 3.

A A are the two draw-heads. These I form to have the double throats $A^1$ $A^2$, which are of the constructive shape more clearly shown in Fig. 1.

The entrance of the throat $A^1$ is beveled, (see Figs. 1 and 2,) for the purpose of achieving a ready and safe entrance of the draw-hooks in the act of coupling. The chamber of each throat $A^1$ has its inner walls formed to present a shoulder, $a$, (see Figs. 1, 2,) upon which the link rests. The chambers of the throat $A^2$ are simply fitted to contain the draw-hooks.

B are the draw-hooks. These are constructed in shape as shown in the figures, the hook ends $b$ being curved or beveled to facilitate their entrance into the beveled entrance of the opposite throats. Said hook ends $b$ are further beveled, so that when coupled with these links the strain shall be in center line of the parts, and allow for the lateral play of the cars.

I pivot the draw-hooks B to a bolt, $b'$. Also, to same bolt I pivot the links C, which I provide in each throat $A^1$ of the draw-heads.

The links C rest upon the shoulders $a$ before alluded to, and thus there is sufficient space underneath each link for the opposite draw-hook to pass under the link in order to couple with same by their hook ends $b$.

The further arrangement of the draw-hooks B and links C is such that these parts are positioned opposite to each other—viz., the draw-hook of one car to be in line with the link of the opposite car, and vice versa, as shown in Figs. 3 and 4. It matters not, therefore, how the cars become changed, as each car contains its own self-coupling. It is apparent that when cars come in contact the coupling is effected automatically, each draw-hook first passing under each link, sufficiently raising same until the hook ends have passed behind, the weight of the links dropping them over the hooks, and thus the self-coupling is accomplished.

To uncouple, I provide a hand-lever, D, pivoted at $d$, and which, further, is suitably connected to each link C. (See Fig. 2.) The hand-lever should extend to the sides of the car. By depressing the lever the links are raised, and the draw-hooks can be withdrawn. The cars can thus be uncoupled from below.

A similar connection to the links, by a rod reaching to the top of the cars, can be provided to raise the links, and thus uncouple from the top of the car. The necessity of the operator passing between cars to couple or uncouple is therefore avoided.

Further, in the wall of each draw-head I provide a pin-hole and slot, as at $e$, Fig. 1. This feature enables me to use my coupling and couple with cars containing the old link and pin. The link penetrates the slot $e$, and the pin is inserted through link and slot, and thus the ordinary coupling is had.

When used in its entirety my coupling is double-acting, and forms a most safe, reliable, and durable coupling.

What I claim is—

The combination of the links C, bolts $b'$, draw-hooks B, with relation to draw-heads A A, having interior shoulders $a$ and lever attachment D, all constructed to operate as herein shown and described, and for the purpose set forth.

In testimony of said invention I have hereunto set my hand.

WM. CAMP.

Witnesses:
WILLIAM W. HERTHEL,
CHAS. F. MEISNER.